United States Patent Office 3,703,548
Patented Nov. 21, 1972

3,703,548
PROCESS FOR THE PRODUCTION OF
UNSATURATED ACIDS
Makoto Honda, Tokyo, and Kyugo Tanaka and Itaru Watanabe, Kanagawa, Japan, assignors to Asahi Kasei Kogyo Kabushiki Kaisha, Osaka, Japan
No Drawing. Filed Mar. 2, 1971, Ser. No. 120,342
Claims priority, application Japan, Mar. 17, 1970, 45/22,420
Int. Cl. C07c 57/04
U.S. Cl. 260—530 N           3 Claims

ABSTRACT OF THE DISCLOSURE

Unsaturated fatty acids, particularly acrylic acid or methacrylic acid are prepared by oxidizing unsaturated aliphatic aldehydes, particularly acrolein or methacrolein, in gaseous phase with molecular oxygen-containing gas in the presence of a catalyst of $$Mo_aTl_bX_cO_d$$

where
X is Re, Hg, Cu, Co, V or Ga;
$a=1$;
$b=0.01-0.5$;
$c=0-1.0$; and
$d=$a number defined depending on the oxidation state of Mo and the other metallic elements, and within the range between 3.05 and 4.85.

---

This invention relates to a novel catalyst composition which is useful for the production of unsaturated fatty acids by reacting unsaturated aliphatic aldehydes with molecular oxygen-containing gas, a process for producing the same catalyst and the use thereof. More particularly, this invention relates to an improvement in the production of acrylic or methacrylic acid in high yield by oxidizing acrolein or methacrolein in gaseous phase with molecular oxygen-containing gas.

There are many processes and proposals for producing unsaturated fatty acids by catalytically oxidizing unsaturated aliphatic aldehydes in gaseous phase. According to one of proposals (Japanese patent publication 12,886/1969), acrylic or methacrylic acid, for example, is prepared by oxidizing acrolein or methacrolein, respectively, with molecular oxygen-containing gas, such as air, in the presence of a catalyst consisting of oxides of Mo and Sb at 350° C. for 4.0 sec. of contact time. However, yields are 16.2% and 41.8% based on acrolein fed and exhausted, respectively, for acrylic acid; 19.4% and 41.2% based on methacrolein fed and exhausted, respectively, for methacrylic acid, when contact time is 4.1 sec. Disadvantage of the process is that no improvement can be expected with respect to yield, because the burning of the reactants and/or the products takes place much more easily than the conversion of acrolein or methacrolein at such high temperature. The yield, at such high temperature, therefore, is decreased as the conversion is made higher.

It is an object of the present invention to provide a novel catalyst which improves the yield of acrylic or methacrylic acid.

It is another object of the present invention to provide an improved process for producing acrylic or methacrylic acid with high conversion and high selectivity by a catalytic reaction.

According to the present invention, the catalyst has the following composition:

$$Mo_aTl_bX_cO_d$$

wherein
X is Re, Hg, Cu, Co, V or Ga, $a$ is 1,
$b$ is 0.01–0.5,
$c$ is 0–1.0 and
$d$ is a number defined depending on oxidation state of Mo and the other metallic elements, and within the range between 3.05 and 4.85.

Chlorine, may for example, be included in the catalyst composition, when chlorine-containing compounds are used.

The catalyst includes two modes, i.e., (i) $$Mo_aTl_bO_d$$

and (ii) $$Mo_aTl_bX_cO_d$$

Preferable values for the suffixes $b$ and $c$ are that $b=0.01-0.5$, most preferably, 0.01–0.2 in the latter case, and $c=0.01-0.5$.

The present catalyst may be mixed with or carried on an inert carrier such as silica and/or alumina. Grain size of the catalyst is not critical. It can be used for both fixed-bed and fluidized-bed systems.

The catalyst can be prepared by mixing an aqueous solution of salts of thallium with silica sol, and adding thereto aqueous solutions of molybdic acid or molybdate as well as, if desired, of salts of at least one of metals such as Re, Hg, Cu, Co, V and Ga. The salts of thallium and the salts of metals referred to above include $TlNO_3$, $ReCl_3$, $HReO_4$, $(NH_4)ReO_4$, $Hg(CH_3COO)_2$, $Cu(CH_3COO)_2$, $CO(NO_3)_2$, $(NH_4)VO_3$, and $GaO_3$. Alternatively, suspensions may be used in place of the solutions. The product is thoroughly mixed, and evaporated to dryness. After that, the product is calcined at 350°–450° C. for 1 hour or longer. The nature of the catalyst thus prepared relies mainly upon the resultant catalyst composition.

The catalyst thus obtained is packed in a reactor whose temperature can be controlled. Acrolein or methacrolein is introduced in the gas form into the reactor together with oxygen or air and, if desired, with steam and/or an inert gas such as nitrogen, carbon dioxide or propane. Reaction temperature is 250°–400° C., preferably 270°–350° C. Most preferably, contact time is 0.3–24 sec., concentration of unsaturated aldehyde is 1–10 mol percent, and oxygen concentration is 0.5–15 mol percent.

In the present process, there are produced acetic acid, carbon dioxide, carbon monoxide as well as the corresponding fatty acids to the starting unsaturated aliphatic aldehydes.

The following examples illustrate the present invention. In the examples,

Conversion (percent)
$$=\frac{\text{weight of carbon in unsaturated aliphatic aldehyde reacted}}{\text{weight of carbon in unsaturated aliphatic aldehyde fed}} \times 100$$

Selectivity (percent)
$$=\frac{\text{weight of carbon in the desired product}}{\text{weight of carbon in unsaturated aliphatic aldehyde reacted}} \times 100$$

Yield (percent)
$$=\frac{\text{weight of carbon in the desired product}}{\text{weight of carbon in unsaturated aliphatic aldehyde fed}} \times 100$$

A part of the product is analyzed by means of gas-chromatography.

EXAMPLE 1

Water (25 ml.) was added to $TlNO_3$ (2.73 g.) and heated on a water bath. Silica sol (97 g.) (silica content=20% by weight) was mixed therewith and then a hot aqueous solution containing 18.1 g.

$$(NH_4)_6Mo_7O_{24} \cdot 4H_2O$$

and 3.0 g. $ReCl_3$ in 150 ml. of water. The suspension thus obtained was heated on a water-bath and at the same time, water was removed under reduced pressure. The product was dried overnight at 110° C. The product was ground in a bowl to 16–32 mesh. The powders were calcined in an electric furnace at 380° C. for 1 hour. The composition is $Mo_2Tl_{0.1}Re_{0.1}$ in atomic ratio.

The catalyst thus obtained (3 ml.) was packed in a U-shaped stainless steel reactor (6 mm$\phi$) and was kept at 310° C. in a molten salt bath. Gas comprising 6 vol. percent of acrolein, 6 vol. percent of oxygen, 58 vol. percent of nitrogen and 30 vol. percent of steam was fed at a speed of 1.7 sec. of contact time. Conversion of acrolein was 99% and selectivity for acrylic acid was 85%. In addition, there were produced acetic acid, carbon dioxide and carbon monoxide.

EXAMPLES 2–4

Example 1 was repeated but compounding ratios among Mo, Tl and Re were changed as mentioned herein below and gas composition was 7 vol. percent of oxygen and 57 vol. percent of nitrogen in place of 6 and 58% respectively.

TABLE 1

| Number | Atomic ratio Mo:Tl:Re | Conversion of acrolein | Selectivity for acrylic acid | Form of Re compounds to be added |
|---|---|---|---|---|
| 2 | 1:0.1:0.04 | 70 | 81 | $NH_4ReO_4$ |
| 3 | 1:0.1:0.2 | 88 | 80 | $HReO_4$ |
| 4 | 1:0.2:0.5 | 65 | 70 | $ReCl_3$ |

EXAMPLE 5

Hot water (50 ml.) was added to $TlNO_3$ (6.04 g.) to prepare a solution. The solution was mixed with silica sol (197.5 g.) and further a hot aqueous solution of 40 g. ammonium molybdate $(NH_4)_6Mo_7O_{24} \cdot 4H_2O$ and 2.67 g. $NH_4VO_3$ in water (150 ml.) was added thereto. The suspension thus obtained was heated on a water bath and dried under reduced pressure. The dried product was further dried overnight at 110° C. The product was ground in a bowl and calcined in an electric furnace at 380° C. for 1 hour to obtain a catalyst of $Mo_1Tl_{0.1}V_{0.1}$ in atomic ratio.

The catalyst (3 ml.) was packed in a U-shaped reactor (6 mm$\phi$) and was kept at 330° C. in a molten salt bath. Gas consisting of 6 vol. percent of acrolein, 4.5 vol. percent of oxygen, 59.5 vol. percent of nitrogen and 30 vol. percent of steam was fed at a speed of 0.4 sec. of contact time. Conversion of acrolein was 87% and selectivity for acrylic acid was 86%.

EXAMPLE 6

Example 5 was repeated but a catalyst of $Mo_1Tl_{0.04}V_{0.4}$ in atomic ratio was prepared and gas containing acrolein and oxygen (acrolein 5%, $O_2$ 6%, $N_2$ 64% and steam 25% by volume) was introduced at a speed of 3.5 sec. of contact time at 290° C. Conversion of acrolein was 99%, and selectivity for acrylic acid was 83%.

EXAMPLE 7

A catalyst prepared as in Example 1 was packed in a reactor kept at 270° C. Gas comprising 5 vol. percent of methacrolein, 5 vol. percent of oxygen, 60 vol. percent of nitrogen and 30 vol. percent of steam was passed on the catalyst at a speed of 3.8 sec. of contact time. Conversion of methacrolein was 84% and selectivity for methacrylic acid was 72%.

EXAMPLE 8

$TlNO_3$ (6.04 g.) was dissolved in hot water (50 ml.) and then mixed with silica sol (197 g.). A suspension of ammonium molybdate (40 g.) and gallium oxide (2.12 g.) in hot water (150 ml.) was added thereto. The product was dried and calcined in the same manner as Example 1, to obtain a catalyst of $Mo_1Tl_{0.1}Ga_{0.1}$ in atomic ratio.

The catalyst was charged in a reactor kept at 350° C. and gas containing acrolein and oxygen (acrolein 6%, $O_2$ 7%, $N_2$ 57% and steam 30% by volume) was passed thereon at a speed of 1.5 sec. of contact time. Conversion of acrolein was 76% and selectively for acrylic acid was 70%.

EXAMPLE 9

A mixed solution (197 g.) of ammonium molybdate and cobalt nitrate was added to a mixed solution (173 g.) of $TlNO_3$ and silica sol. The suspension thus obtained was dried and calcined in the same manner as Example 1 to produce a catalyst of $Mo_1Tl_{0.1}Co_{0.1}$ in atomic ratio. The catalyst was packed in a reactor kept at 290° C. and contacted with gas containing acrolein and oxygen (acrolein 5%, $O_2$ 5%, $N_2$ 60% and steam 30% by volume) for 12.8 sec. Conversion of acrolein was 95% and selectivity for acrylic acid was 82%.

EXAMPLE 10

Aqueous solutions of thallium nitrate, ammonium molybdate and copper acetate, respectively, were mixed with silica sol. The mixture was evaporated to dryness, ground and calcined in an electric furnace at 380° C. for 1 hour. The composition of the catalyst is $Mo_1Tl_{0.1}Cu_{0.1}$ in atomic ratio.

The catalyst was charged in a reactor kept at 310° C. and gas containing methacrolein and oxygen (methacrolein 6%, $O_2$ 6%, $N_2$ 58% and steam 30% by volume) was passed on the catalyst at a speed of 1.7 sec. of contact time. Conversion of methacrolein was 71% and selectivity for acrylic acid was 71%.

EXAMPLE 11

Aqueous solutions of thallium nitrate, ammonium molybdate and copper acetate [$Cu(CH_3COO)_2$], respectively, were mixed with silica sol. The mixture was heated and dried under reduced pressure. The product was ground and calcined in an electric furnace at 380° C. to obtain a catalyst of $Mo_1Tl_{0.1}Cu_{0.1}$ in atomic ratio.

The catalyst was charged in a reactor kept at 310° C. and gas containing acrolein and oxygen (acrolein 5%, $O_2$ 5%, $N_2$ 55% and steam 35% by volume) was introduced at a speed of 3.5 sec. of contact time. Conversion of acrolein was 94% and selectively for acrylic acid was 70%.

EXAMPLE 12

Aqueous solutions of thallium nitrate, ammonium molybdate and mercury acetate [$Hg(CH_3COO)_2$], respectively, were mixed with silica sol. The mixture was heated and dried under reduced pressure. The product was ground and calcined in an electric furnace at 360° C. for 1 hour, to obtain a catalyst of $Mo_1Tl_{0.1}Hg_{0.1}$ in atomic ratio.

The catalyst was charged in a reactor kept at 280° C. Gas containing acrolein and oxygen (acrolein 6%, $O_2$ 5%, $N_2$ 59% and steam 30% by volume) was passed through the reactor at a speed of 23.3 sec. of contact time. Conversion of acrolein was 96% and selectivity for acrylic acid was 77%.

EXAMPLE 13

3.64 grams of thallium nitrate dissolved in 50 ml. hot water was mixed with 96 g. of silica sol. To this mixture was further added 20 g. ammonium molybdate dissolved in 80 ml. hot water. The suspension obtained was heated in a hot water-bath and dried under reduced pressure. The dried product was further dried overnight at 110° C.

The dried solid substance was ground in a bowl to 16–32 mesh. The powders were calcined in an electric furnace at 380° C. for 1 hour to obtain a catalyst of $Mo_1Tl_{0.12}$ in atomic ratio.

The catalyst (3 ml.) was packed in a U-shaped reactor (6 mmφ) and kept at 310° C. in a molten salt bath. Gas consisting of 4.5 vol. percent of acrolein, 22.5 vol. percent of air, 43 vol. percent of nitrogen and 30 vol. percent of steam was fed at a speed of 1.7 sec. of contact time. Conversion of acrolein was 39% and selectivity for acrylic acid was 71.5%.

What is claimed is:

1. A process for producing acrylic or methacrylic acid which comprises contacting at 250° to 450° C. acrolein or methacrolein with molecular oxygen containing gas in the presence of a catalyst of $Mo_aTl_bX_cO_d$ wherein X is Re, Hg, Cu, Co, V or Ga, $a=1$,
$b=0.01$–$0.5$
$c=0$–$1.0$ and
$d=$a number defined depending on the oxidation state of Mo and the other metallic elements and with the range between 3.05 and 4.85.

2. A process according to claim 1, wherein acrolein or methacrolein is contacted with the molecular oxygen containing gas for 0.3 to 24 seconds.

3. A process according to claim 1, wherein $b$ is from 0.01 to 0.2 and $c$ is from 0.01 to 0.5.

No references cited.

LORRAINE A. WEINBERGER, Primary Examiner

R. D. KELLY, Assistant Examiner

U.S. Cl. X.R.

252—465